United States Patent
Adkisson et al.

(10) Patent No.: US 7,624,319 B2
(45) Date of Patent: Nov. 24, 2009

(54) PERFORMANCE MONITORING SYSTEM

(75) Inventors: Richard W. Adkisson, Dallas, TX (US); Tyler Johnson, Murphy, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 752 days.

(21) Appl. No.: 11/022,079

(22) Filed: Dec. 23, 2004

(65) Prior Publication Data

US 2005/0273671 A1    Dec. 8, 2005

Related U.S. Application Data

(60) Provisional application No. 60/576,764, filed on Jun. 3, 2004.

(51) Int. Cl.
*G01R 31/28*    (2006.01)
*G11C 29/00*    (2006.01)

(52) U.S. Cl. .................... 714/724; 714/733; 714/744; 714/712; 714/731; 365/201

(58) Field of Classification Search ............... None
See application file for complete search history.

(56) References Cited

U.S. PATENT DOCUMENTS

| | | | |
|---|---|---|---|
| 4,084,225 A | 4/1978 | Anderson | |
| 4,796,211 A | 1/1989 | Yokouchi | |
| 4,799,190 A | 1/1989 | Douglas | |
| 4,821,178 A | 4/1989 | Levin | |
| 5,260,979 A * | 11/1993 | Parker et al. | 375/366 |
| 5,347,540 A * | 9/1994 | Karrick | 375/224 |
| 5,517,155 A | 5/1996 | Yamauchi | |
| 5,579,527 A | 11/1996 | Chin | |
| 5,581,163 A | 12/1996 | Alves de Lima | |
| 5,588,115 A * | 12/1996 | Augarten | 714/29 |
| 5,590,304 A * | 12/1996 | Adkisson | 711/100 |
| 5,610,925 A | 3/1997 | Takahashi | |
| 5,644,578 A | 7/1997 | Ohsawa | |
| 5,651,112 A | 7/1997 | Matsuno et al. | |
| 5,729,678 A | 3/1998 | Hunt | |
| 5,796,633 A | 8/1998 | Burgess et al. | |
| 5,819,053 A | 10/1998 | Goodrum | |
| 5,835,702 A | 11/1998 | Levine et al. | |
| 5,880,671 A | 3/1999 | Ranson | |
| 5,881,223 A | 3/1999 | Agrawal et al. | |

(Continued)

FOREIGN PATENT DOCUMENTS

DE    3700426 C2    8/1987

(Continued)

OTHER PUBLICATIONS

Translation of German Office Action (German Appl. No. 102005020656.5-53) dated Jan. 4, 2006 (2 pages).

(Continued)

*Primary Examiner*—Kevin L Ellis
*Assistant Examiner*—Guerrier Merant

(57) ABSTRACT

A system for validating data collected in a first clock domain. A performance counter is disposed in a second clock domain to perform performance computations relative to the data. Validation circuitry is in communication with the data in order to provide to the performance counter a validation signal indicative of the validity of the data.

16 Claims, 5 Drawing Sheets

U.S. PATENT DOCUMENTS

| | | | |
|---|---|---|---|
| 5,881,224 A | | 3/1999 | Ranson |
| 5,887,003 A * | | 3/1999 | Ranson et al. ............. 714/736 |
| 5,930,482 A | | 7/1999 | Carter |
| 5,931,926 A * | | 8/1999 | Yeung et al. ................. 710/52 |
| 5,956,477 A | | 9/1999 | Ranson |
| 6,112,317 A | | 8/2000 | Berc et al. |
| 6,112,318 A | | 8/2000 | Jouppi et al. |
| 6,134,676 A | | 10/2000 | VanHuben |
| 6,189,072 B1 | | 2/2001 | Levine |
| 6,226,698 B1 * | | 5/2001 | Yeung et al. ................. 710/57 |
| 6,356,615 B1 | | 3/2002 | Coon |
| 6,360,337 B1 | | 3/2002 | Zak et al. |
| 6,360,343 B1 | | 3/2002 | Turnquist |
| 6,463,553 B1 | | 10/2002 | Edwards |
| 6,487,683 B1 | | 11/2002 | Edwards |
| 6,502,210 B1 | | 12/2002 | Edwards |
| 6,546,359 B1 | | 4/2003 | Week |
| 6,557,119 B1 | | 4/2003 | Edwards et al. |
| 6,615,370 B1 | | 9/2003 | Edwards et al. |
| 6,658,578 B1 * | | 12/2003 | Laurenti et al. ............. 713/324 |
| 6,684,348 B1 | | 1/2004 | Edwards et al. |
| 6,732,307 B1 | | 5/2004 | Edwards |
| 6,750,693 B1 | | 6/2004 | Duewer |
| 6,826,247 B1 * | | 11/2004 | Elliott et al. ................. 375/376 |
| 6,831,523 B1 * | | 12/2004 | Pastorello et al. ............. 331/25 |
| 7,003,599 B2 | | 2/2006 | Warren |
| 7,346,824 B2 | | 3/2008 | Adkisson |
| 7,373,561 B2 * | | 5/2008 | Baumer et al. ............. 714/704 |
| 7,424,397 B2 | | 9/2008 | Adkisson |
| 2002/0054537 A1 | | 5/2002 | Pascucci |
| 2002/0166012 A1 | | 11/2002 | Natarajan |
| 2002/0196886 A1* | | 12/2002 | Adkisson ................... 375/362 |
| 2003/0036883 A1 | | 2/2003 | Mericas |
| 2003/0217302 A1 | | 11/2003 | Chen |
| 2004/0003329 A1* | | 1/2004 | Cote et al. ................. 714/726 |
| 2004/0059967 A1* | | 3/2004 | Kleppel et al. ................ 714/52 |
| 2004/0083077 A1* | | 4/2004 | Baumer et al. ............. 702/185 |
| 2004/0210782 A1 | | 10/2004 | Hsu |
| 2005/0162199 A1* | | 7/2005 | Green et al. ................. 327/156 |
| 2005/0283669 A1 | | 12/2005 | Adkisson |
| 2005/0283677 A1 | | 12/2005 | Adkisson |

FOREIGN PATENT DOCUMENTS

| | | |
|---|---|---|
| DE | 102005020656 | 12/2005 |
| EP | 0897152 | 2/1999 |
| GB | 2401447 | 11/2004 |
| GB | 2313829 | 12/2005 |

OTHER PUBLICATIONS

GB Search Report (GB 0409007.2) dated Aug. 17, 2004 (1 page).
GB Search Report (GB 0510741.2) dated Sep. 16, 2005 (1 page).
U.S. Appl. No. 11/021,259, Office Action dated Mar 16, 2009, pp. 1-5 and attachments.
U.S. Appl. No. 11/021,259, Notice of Allowance dated Jul. 1, 2009 (4 pages).
U.S. Appl. No. 11/022,021, Office Action dated May 31, 2007, pp. 1-3 and attachments.
U.S. Appl. No. 11/022,021, Final Rejection dated Nov. 9, 2007, pp. 1-4.
U.S. Appl. No. 11/022,021, Office Action dated Mar. 3, 2008, pp. 1-4 and attachments.
U.S. Appl. No. 11/022,021, Final Rejection dated Aug. 5, 2008, pp. 1-4.
U.S. Appl. No. 11/022,021, Examiner's Answer dated Dec. 17, 2008, pp. 1-7.
U.S. Appl. No. 11/022,023, Office Action dated May 1, 2007, pp. 1-7 and attachments.
U.S. Appl. No. 11/022,023, Notice of Allowance dated Oct. 22, 2007 (4 pages).
U.S. Appl. No. 10/635,083, Office Action dated Jun. 27, 2007, pp. 1-11 and attachments.
U.S. Appl. No. 10/635,083, Final Rejection dated Jan. 4, 2008, pp. 1-14 and attachments.
U.S. Appl. No. 10/635,083, Notice of Allowance dated Jun. 3, 2008, pp. 1-5.

* cited by examiner

PERFORMANCE MONITORING SYSTEM

PRIORITY UNDER 35 U.S.C. §119(e) & 37 C.F.R. §1.78

This nonprovisional application claims priority based upon the following prior United States provisional patent application entitled: "PERFORMANCE MONITORING SYSTEM," Application No. 60/576,764, filed Jun. 3, 2004, in the name(s) of: Richard W. Adkisson and Tyler J. Johnson, which is hereby incorporated by reference.

CROSS-REFERENCE TO RELATED APPLICATIONS

This application is related to U.S. patent application Ser. No. 11/021,259 (U.S. Patent Publication No. 2005/0283677), filed Dec. 23, 2004 entitled "DURATION MINIMUM AND MAXIMUM CIRCUIT FOR PERFORMANCE COUNTER"; U.S. patent application Ser. No. 11/022,023 (U.S. Pat. No. 7,346,824), filed Dec. 23, 2004 entitled "MATCH CIRCUIT FOR PERFORMING PATTERN RECOGNITION IN A PERFORMANCE COUNTER"; U.S. patent application Ser. No. 11/022,021 (U.S. Patent Publication No. 2005/0283669), filed Dec. 23, 2004 entitled "EDGE DETECT CIRCUIT FOR PERFORMANCE COUNTER"; and U.S. patent application Ser. No. 10/635,083 (U.S. Pat. No. 7,424,397), filed Aug. 6, 2003 entitled "GENERAL PURPOSE PERFORMANCE COUNTER"; all of which are hereby incorporated by reference in their entirety.

BACKGROUND

Increasing demand for computer system scalability (i.e., consistent price and performance and higher processor counts) combined with increases in performance of individual components continues to drive systems manufacturers to optimize core system architectures. One such systems manufacturer has introduced a server system that meets these demands for scalability with a family of application specific integrated circuits ("ASICs") that provide scalability to tens or hundreds of processors, while maintaining a high degree of performance, reliability, and efficiency. The key ASIC in this system architecture is a cell controller ("CC"), which is a processor-I/O-memory interconnect and is responsible for communications and data transfers, cache coherency, and for providing an interface to other hierarchies of the memory subsystem.

In general, the CC comprises several major functional units, including one or more processor interfaces, memory units, I/O controllers, and external crossbar interfaces all interconnected via a central data path ("CDP"). Internal signals from these units are collected on a performance monitor bus ("PMB"). One or more specialized performance counters, or performance monitors, are connected to the PMB and are useful in collecting data from the PMB for use in debugging and assessing the performance of the system of which the CC is a part. Currently, each of the performance counters is capable of collecting data from only one preselected portion of the PMB, such that the combination of all of the performance counters together can collect all of the data on the PMB. While this arrangement is useful in some situations, there are many situations in which it would be advantageous for more than one of the performance counters to access data from the same portion of the PMB. Additionally, it would be advantageous to be able to use the performance counters in conjunction with data collected in a clock domain different from that associated with the performance counter.

SUMMARY

In one embodiment, a system for validating data collected in a first clock domain is disclosed. A performance counter is disposed in a second clock domain to perform performance computations relative to the data. Validation circuitry is in communication with the data in order to provide to the performance counter a validation signal indicative of the validity of the data.

DETAILED DESCRIPTION OF THE DRAWINGS

Figure 1:
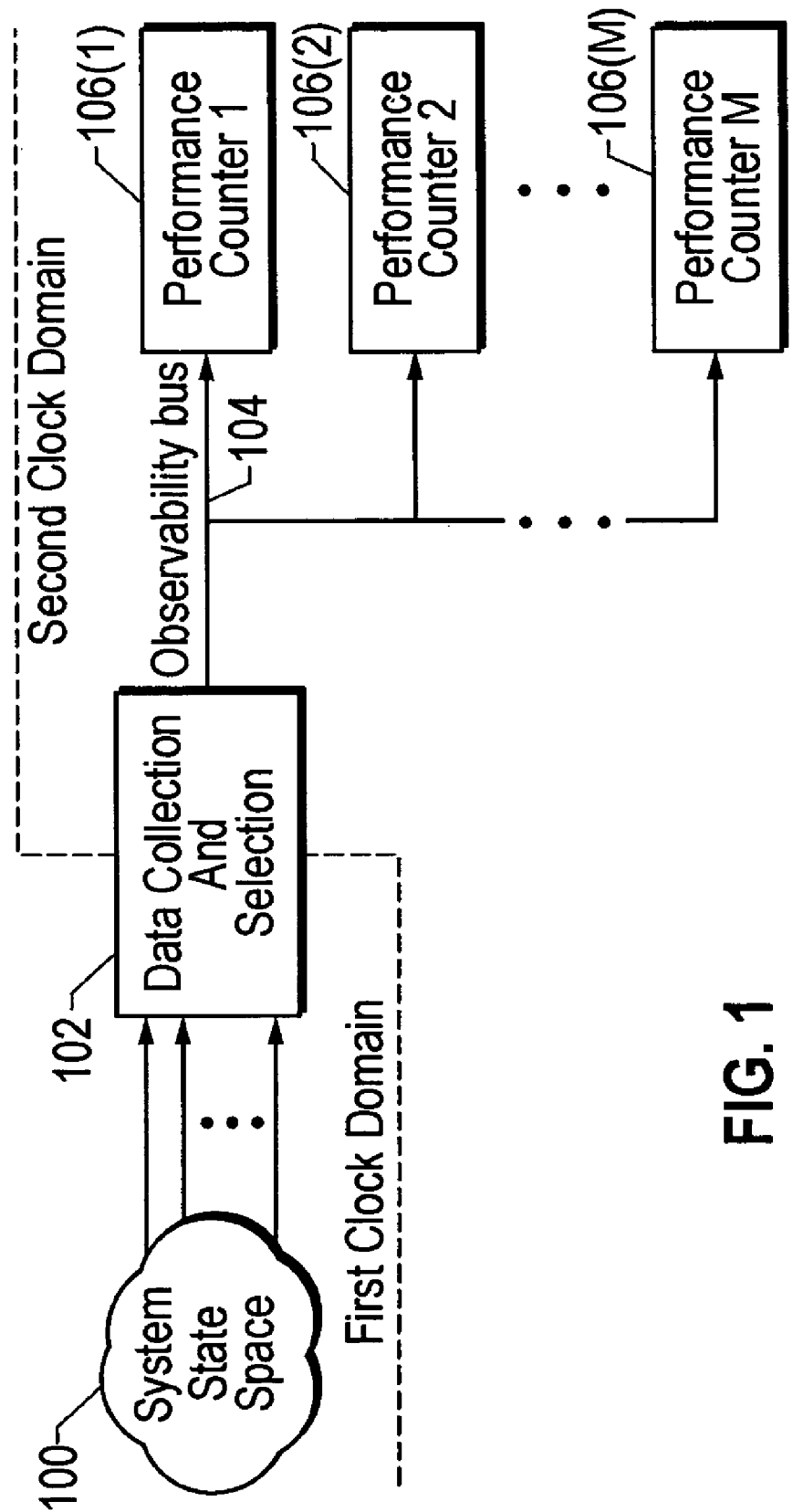
FIG. 1 is a block diagram illustrating one embodiment of a general purpose data collection in a logic design.

In the drawings, like or similar elements are designated with identical reference numerals throughout the several views thereof, and the various elements depicted are not necessarily drawn to scale.

FIG. 1 is a block diagram of general purpose data collection in a logic design. As shown in FIG. 1, the state space 100 of a logic design under consideration is driven to data collection and selection logic 102. The logic 102 drives a D-bit data collection, or observability, bus 104 carrying a D-bit debug_bus signal to a plurality of performance counters 106 (1)-106(M). In one embodiment, D is equal to 80, M is equal to 12, and performance counters 106(1)-106(M1-1) are general purpose performance counters, while the remaining performance counter 106(M) increments on every clock cycle. As will be illustrated below, the general purpose performance counters are "general purpose" in that each of them is capable of accessing any bit of the 80-bits on the bus 104; moreover, all of them may access the same block of bits and do the same or different performance calculations thereon.

Further, in the illustrated embodiment, the system state space 100 is disposed in a first clock domain and the performance counters 106(1)-106(M) are disposed in a second clock domain. As will be described in further detail hereinbelow, validation circuitry, which may be integrated with the data collection and selection circuitry 102 at the interface of the first clock domain and the second clock domain, forwards the data collected in system state space 100 along with a validation signal to one or more of the performance counters 106(1)-106(M). The validation signal indicates the validity of the data and may inform the performance counters 106(1)-106(M) of invalid cycles that contain no data or duplicate data, for example, especially where the two clock domains are clocked at different frequencies.

Figure 2:
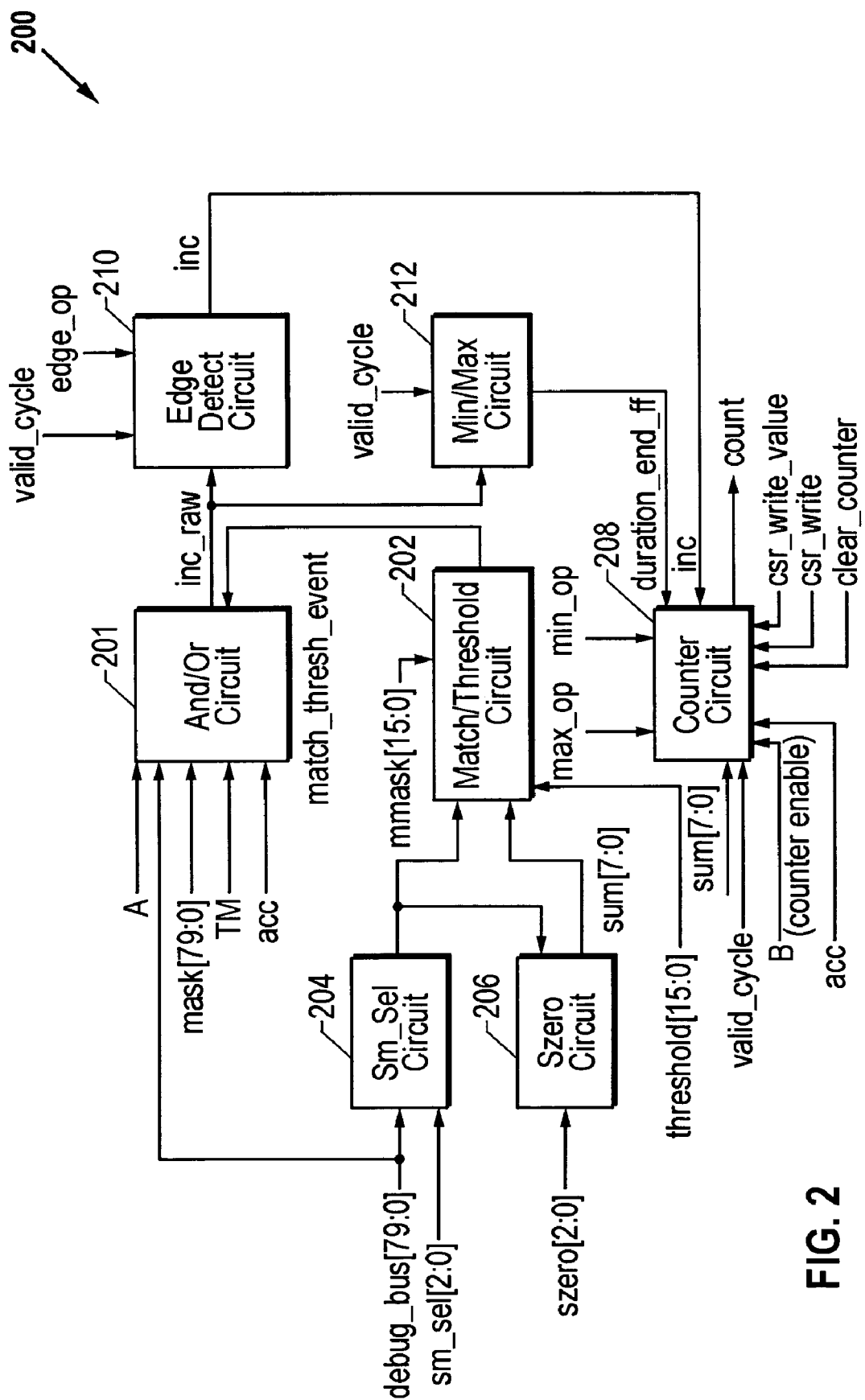
FIG. 2 is a block diagram of a general purpose performance counter according to one embodiment.

FIG. 2 is a general purpose performance counter 200 according to one embodiment. The performance counter 200: can be used to perform general purpose operations to extract performance, debug, or coverage information with respect to any system under test (SUT) such as, for instance, the system state space 100 shown in FIG. 1. The performance counter 200 includes an AND/OR circuit 201, a match/threshold circuit 202, an sm_sel circuit 204, an szero circuit 206, a counter circuit 208, an edge detect circuit 210, and a min/max circuit 212.

In general, the AND/OR circuit 201 enables access to any and all of the bits of the debug_bus signal coming into the performance counter 200 from the observability bus 104, which depending on the configuration of the validation circuitry, may collect data from either the clock domain of the performance counter 200 or another clock domain. In one embodiment, as illustrated in FIG. 2, debug_bus is an 80-bit signal. In addition to the debug_bus, the AND/OR circuit 201 receives an A signal, a TM signal, and an acc signal. When the AND/OR circuit 201 is operating in AND mode, the circuit activates a raw increment signal or an inc_raw signal, which may be indicative of an event detect signal, to the edge detect circuit 210 if all of the bits of the debug_bus signal plus two bits that are appended thereto that are of interest (as indicated by the value of an 80-bit "mask" plus two bits that are appended thereto) are set. When the AND/OR circuit 201 is operating in OR mode, the circuit activates the inc_raw signal to the edge detect circuit 210 if any one or more of the bits of the debug_bus signal plus the two additional bits that are of interest (as indicated by the value the mask plus the two additional bits) are set.

The match/threshold circuit 202 receives inputs from the sm_sel circuit 204 and szero circuit 206 in addition to a mmask [15:0] input. When the match/threshold circuit 202 is operating in "match" mode, a portion of the circuit activates a match_thresh event signal to the AND/OR circuit 201 when an N-bit portion of the debug_bus signal selected as described in greater detail below with reference to the sm_sel circuit 204 and the szero circuit 206 matches an N-bit threshold for all bits selected by a match mask ("mmask"). In particular, for all bits of the selected N-bit debug bus signal portion that are "don't cares", the corresponding bit of mmask will be set to 0; conversely, for all bits of the selected N-bit debug bus signal portion that are not "don't cares", the corresponding bit of mmask will be set to 1. The match_thresh_event signal is one of the two bits appended to the debug_bus signal. In the illustrated embodiment, N is equal to 16.

When the match/threshold circuit 202 is operating in "threshold" mode, a portion of the circuit 202 activates the match_thresh_event signal to the AND/OR circuit 201 when an S-bit portion of the debug_bus signal selected and zeroed as described in greater detail below with reference to the sm_sel circuit 204 and the szero circuit 206 is equal to or greater than the threshold. In the illustrated embodiment, S is equal to N/2, or 8.

The sm_sel circuit 204 selects an N-bit portion of the debug_bus signal aligned on a selected 10-bit block boundary into both the match portion and the threshold portion of the match/threshold circuit 202 and to a sum input of the counter circuit 208. As previously stated, in the illustrated embodiment, N is equal to 16. The szero circuit 206 zeroes out none through all but one of S bits aligned on a selected 10-bit block boundary into the threshold portion of the match/threshold circuit 202 and the sum input of the counter circuit 208. In the illustrated embodiment, S is equal to eight. The selected 10-bit block boundary is identified by the value of a three-bit control signal sm_sel input to the sm_sel circuit 204.

The operation of counter circuit 208 is enabled by setting an counter enable signal B, which comprises one input of a three-input AND gate (not illustrated in this FIG.) associated with the counter circuit 208. The second input of the AND gate comprises a validation signal (valid_cycle) that, in one embodiment, discriminates against invalid cycles of a third input signal (i.e., an inc signal) to the AND gate. In general, the counter circuit 208 is an X bit counter that can hold, increment by one, add S bits, clear or load a value. In one embodiment, the performance counter 200 is 48 bits plus overflow that provides a general purpose counter in that it looks at all D bits of the debug_bus signal for an event mask plus two extra events, eight separate selections of 16 bits for the match compare operation and eight separate selections of eight bits for the threshold compare and the accumulate operations. The eight bits for the threshold compare and the accumulate operations are the bottom eight bits of the 16 bits selected for the match compare operation.

As will be discussed in greater detail hereinbelow, the operation of the edge detect circuit 210 is controlled by the inc_raw signal, a valid_cycle signal, and an edge_op signal. Specifically, when the edge detect circuit 210 is operational, the number of times an event begins is detected and driven to the counter circuit as an inc signal. On the other hand, when the edge detect circuit 210 is nonoperational, the inc_raw signal, which is representative of the event itself, is driven to the counter circuit as the inc signal. The validation signal (valid_cycle) received by the edge detect circuit 210 discriminates against invalid cycles of the inc_raw signal.

Similar to the edge detect circuit 210, the operation of the min/max circuit 212 is controlled by the inc_raw signal and the valid_cycle signal. The min/max circuit 212 forwards a duration signal, i.e., duration_end_ff signal, to the counter circuit 208 that counts the minimum or maximum time an event persists. As will be explained further in FIG. 5, a max_op signal and a min_op signal associated with the counter circuit 208 determine whether or not the performance counter 208 utilizes the duration_end_ff signal to determine the maximum or minimum time the event persists. In particular, the validation signal (valid_cycle) received by the min/max circuit 212 discriminates against invalid cycles of the inc_raw signal when the performance counter is utilizing data from different clock domains.

Figure 3:
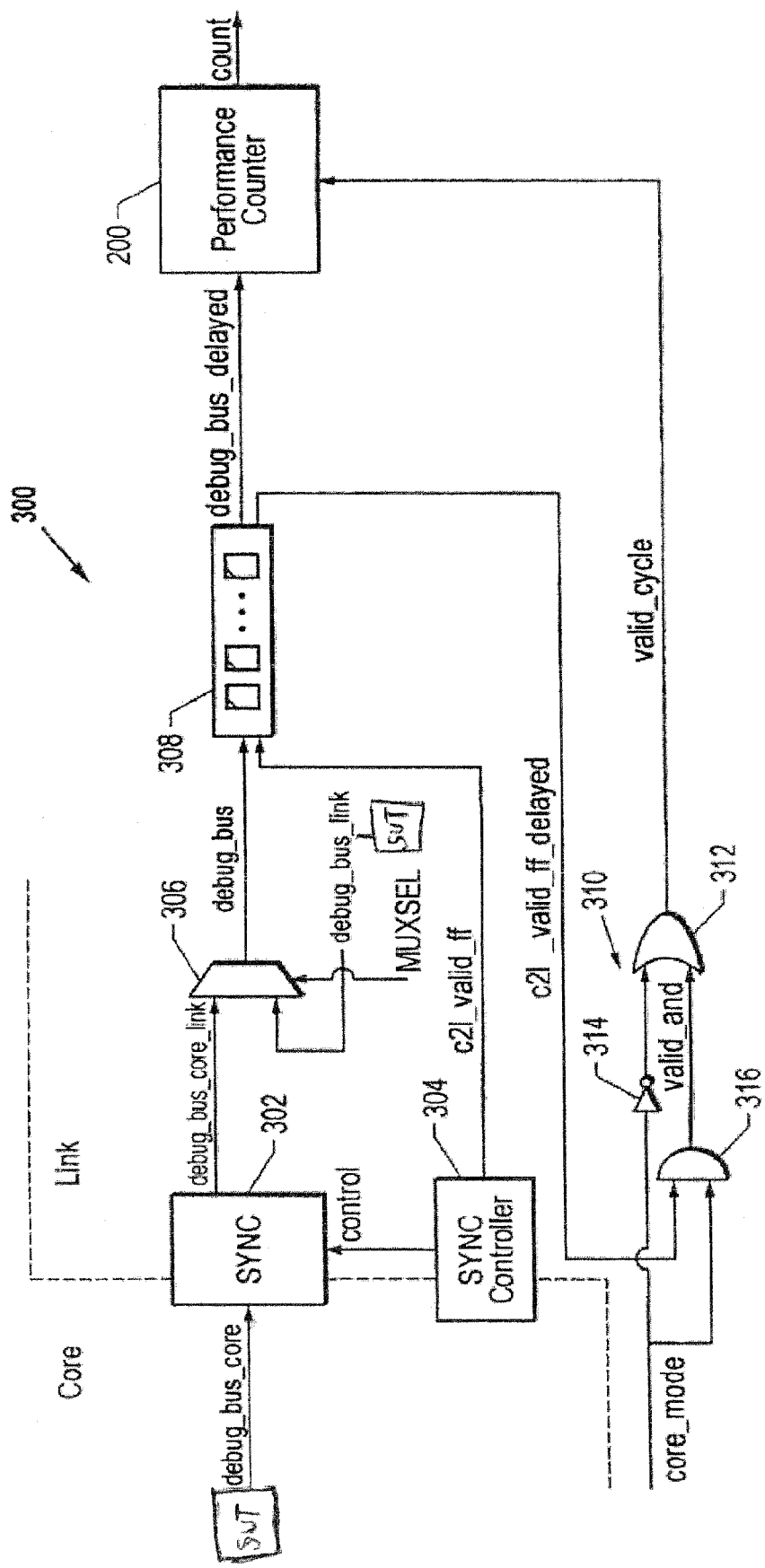
FIG. 3 is a block diagram of one embodiment of validation circuitry related to the general purpose performance counter of FIG. 2.

FIG. 3 illustrates one embodiment of validation circuitry 300 as it relates to the general purpose performance counter 200 of FIG. 2. A debug_bus_core, i.e., a first observability bus, is operable to collect data from a SUT in a core clock domain. Similarly, a debug_bus_link, i.e., a second observability bus, is operable to collect data from a SUT in a link clock domain in which one or more performance counters, e.g., the performance counter 200, are disposed as well for performing various performance operations relative to the data that may comprise intermixed core clock data and link clock data. A synchronizer 302 and synchronizer controller 304 are disposed at the interface of the core clock domain and the link clock domain as illustrated by the dashed line that bisects the synchronizer 302 and the synchronizer controller 304. It should be appreciated that the debug_bus_core may be positioned in any first clock domain having a clock rate of N clock cycles and the performance counter may be disposed in any second clock domain having a clock rate of M clock cycles, wherein N may or may not equal M. In particular, the clock domains of interest may be include a link clock domain, a core clock domain, or a bus clock domain, for example.

The synchronizer controller 304 drives a control signal to the synchronizer 302 to effectuate the transfer of data across the clock domain interface from the debug_bus_core, which is driven at a core clock rate, to another data signal, debug_bus_core_link, which is driven at a link clock rate. The debug_bus_core_link and the debug_bus_link, which may originate in the link clock domain, provide inputs for a multiplexer (MUX) circuit block 306 comprising a number of MUXes, each of which operates under the control of a MUX-SEL signal that may be supplied by a control status register (CSR) (not shown). In one embodiment, if the MUXSEL signal is asserted, then the debug_bus_core_link signal is selected. Otherwise, the debug_bus_link signal is selected. The intermixed data signal output from the MUX block 306 is designated as debug_bus which can include some groups of data from the debug_bus_core_link signal and some groups of data from debug_bus_link signal. In one implementation, as explained generally hereinabove and in particular detail in U.S. patent application Ser. No. 10/635,083 (U.S. Pat. No. 7,424,397), filed Aug. 6, 2003 entitled "GENERAL PURPOSE PERFORMANCE COUNTER", cross-referenced hereinabove, the debug_bus_core_link and debug_bus_link signals comprise 80-bit data signals each, with 8 groups or blocks of 10-bits apiece, wherein the MUX block 306 comprises eight 2-input MUXes for intermixing the data on a block-by-block basis. With this arrangement, the performance monitoring system described herein may perform performance calculations on data collected in the same domain as that of the performance counter 200 or data collected in a domain different from the clock domain of the performance counter 200, even where the debug data is intermixed from different domains.

Continuing to refer to FIG. 3, the debug_bus signal and a transfer control signal called c21_valid_ff, which is supplied by the synchronizer controller 304, are driven to register stages 308 where the debug_bus signal and c21_valid_ff signal may be delayed as required. The output signals from the register stage block 308 are accordingly designated as debug_bus_delayed and c21_valid_ff_delayed signals, wherein the debug_bus_delayed signal is driven to the performance counter 200 for performance computations.

The c21_valid_ff_delayed signal is driven to a logic block 310 which comprises an OR gate 312 coupled to an inverter 314 and an AND gate 316. Additionally, a mode control signal called core_mode is driven to the logic block 310, which core_mode signal may be provided via a CSR (not shown). The core_mode signal indicates whether the observability bus data being utilized is obtained from the same link clock domain as performance counter 200 or a clock domain different from the performance counter 200, e.g., the core clock domain. The c21_valid_ff signal or its delayed counterpart signal is utilized in the latter case when the observabilty bus data being utilized is from a different clock domain. Essentially, the c21_valid_ff signal (or its delayed counterpart) is asserted (e.g., active high) when the data is valid and de-asserted when the data is invalid (which may arise due to the dead cycles between the different clock domains).

In an implementation where data is gathered from the debug_bus_link, the MUXSEL signal is de-asserted such that the MUX block 306 is operable to select the debug_bus link data, on a block-by-block basis. Additionally, the core_mode signal is driven to the inverter 314, which inverts the core_mode signal and drives the inverted core_mode signal to the OR gate 312. In this case, regardless of the output of the AND gate 316, the OR gate 312 asserts the valid_cycle signal as an active high signal to indicate that the data is valid.

On the other hand, in an implementation where data is gathered from the debug_bus_core_link, the MUXSEL signal is asserted thereby causing the MUX block 306 to select the debug_bus_core_link data. Moreover, the core_mode signal is driven to the AND gate 316 along with the c21_valid_ff_delayed signal. The AND gate 316 drives a valid_and signal high to the OR gate 312 only when the core_mode signal and c21_valid_ff signal are both asserted (e.g., active high). Responsive to the valid_and signal, the OR gate 312 asserts the valid_cycle signal.

When considering both implementations, the valid_cycle signal is asserted high when 1) the core_mode is de-asserted or 2) the core_mode is asserted and the c21_valid_ff is asserted. Accordingly, the valid_cycle signal is asserted (i.e., high) when the observability bus is in the same domain as the performance counter 200 or the observability bus is in a different domain from the performance counter 200 and the synchronizer controller indicates that the data is valid. As will be explained in more detail hereinbelow, the valid cycle signal, i.e., the validation signal, indicates the validity of the in-coming performance data associated with the selected observability bus. As previously observed, the data on the invalid cycles could be a repeat of previous or future cycles, or could be zeroed data for invalid cycles. Regardless, the data on the invalid cycles is data that may adversely affect the performance calculations. In one embodiment, the validation signal disables the performance counter 200 on invalid clock cycles by causing particular advanced features of the performance counter 200 to ignore the invalid cycles.

Figure 4:
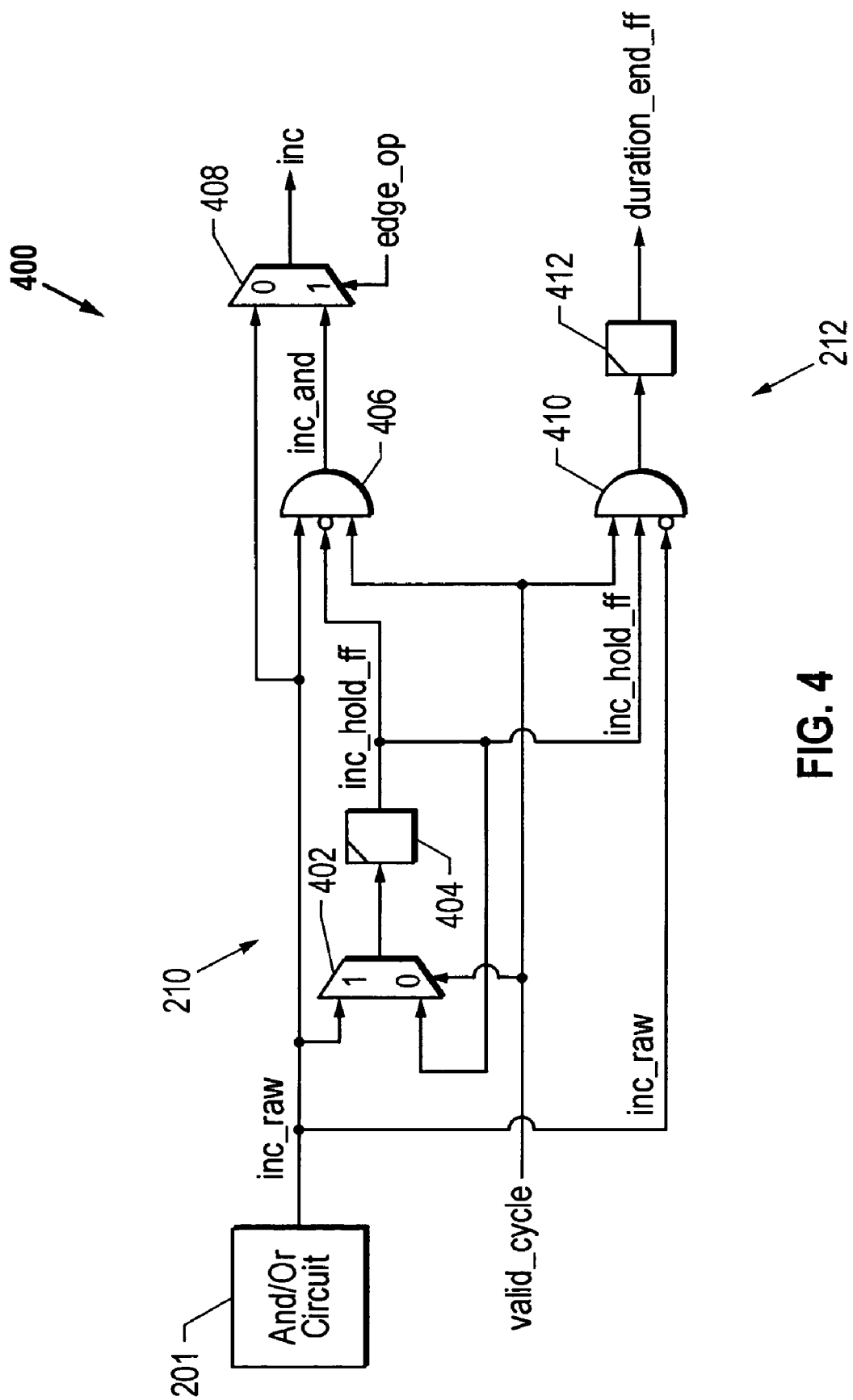
FIG. 4 illustrates a more detailed block diagram of one embodiment of circuitry illustrated in FIG. 2.

FIG. 4 illustrates one embodiment of a circuit 400 that includes the functionality of the edge detect circuit 210 and the min/max circuit 212 illustrated in FIG. 2. A multiplexer 402, a register 404, an AND gate 406, and a multiplexer 408 define the edge detect circuit 210. An AND gate 410 and a register 412 define the min/max circuit 212. With respect to the edge detect portion of the circuit 400, the multiplexer 402 receives inputs inc_raw and inc_hold_ff, which is the inc_raw signal held in register 404, that are selected based on the valid_cycle signal. The inc_raw signal, inc_hold_ff signal, and valid_cycle signal are provided to the AND gate 406, which inverts the inc_hold_ff signal prior to performing the ANDing operation. Upon ANDing the signals, the AND gate 406 drives the inc_and signal to the multiplexer 408, which also receives the inc_raw signal as an input. The control signal edge_op determines whether the inc_raw signal or inc_and signal is asserted as the inc signal to the counter circuit 208.

As discussed, the edge detect circuit portion of the circuit 400 can operate in an active mode or in an inactive mode, wherein the edge_op control signal of the multiplexer 408 determines the mode of operation. If the edge_op signal is de-asserted, then the edge detect circuit is in a inactive mode and the inc_raw signal is selected and asserted as the inc signal. In an active (i.e., operational) mode, the edge_op signal is asserted active high and the inc_and signal is selected to be asserted as the inc signal. More specifically, an edge is detected when the inc_raw signal is asserted active high, the valid_cycle signal is asserted active high, and the inc_hold_ff signal is de-asserted. Hence, an edge is detected during an asserted active high valid cycle which follows a de-asserted cycle. It should be appreciated that during an invalid cycle, i.e., valid_cycle is a logic 0, the register 404 holds the inc_raw signal until a valid cycle is detected.

With respect to the min/max portion of the circuit 400, the valid_cycle signal, the inc_hold_ff signal and an inverted inc_raw signal are provided as inputs to the AND gate 410 which asserts a duration_end_ff signal that is held in register 412 before being driven to the counter circuit 208. Hence, the end of an events duration signal occurs when a de-asserted valid cycle follows an asserted valid cycle. It should be appreciated that with respect to both the edge detect and mm/max portions of circuit 400, the valid_cycle signal indicates the validity of the data associated with the inc_raw signal. If the valid_cycle signal is de-asserted, then the respective ctrcuits ignore the data associated with inc_raw signal. On, the other hand, if the valid_cycle signal is asserted active high, then the circuit portions effectuate the respective counterpart circuits described in the following patent applications: "EDGE DETECT CIRCUIT FOR PERFORMANCE COUNTER," U.S. Patent Publication No. 2005/0283669, in the names of Richard W. Adkisson and Tyler J. Johnson (hereinafter the "Edge Detect Circuit application"); and "DURATION MINIMUM AND MAXIMUM CIRCUIT FOR PERFORMANCE COUNTER," U.S. Patent Publication No. 2005/0283677, in the names of Richard W. Adkisson and Tyler J. Johnson (hereinafter the "MIN/MAX Circuit application"), both of which are hereby incorporated by reference in their entirety for all purposes. Further information regarding the operation of the edge detect circuit and the min/max circuit may therefore be found in these applications.

Figure 5:
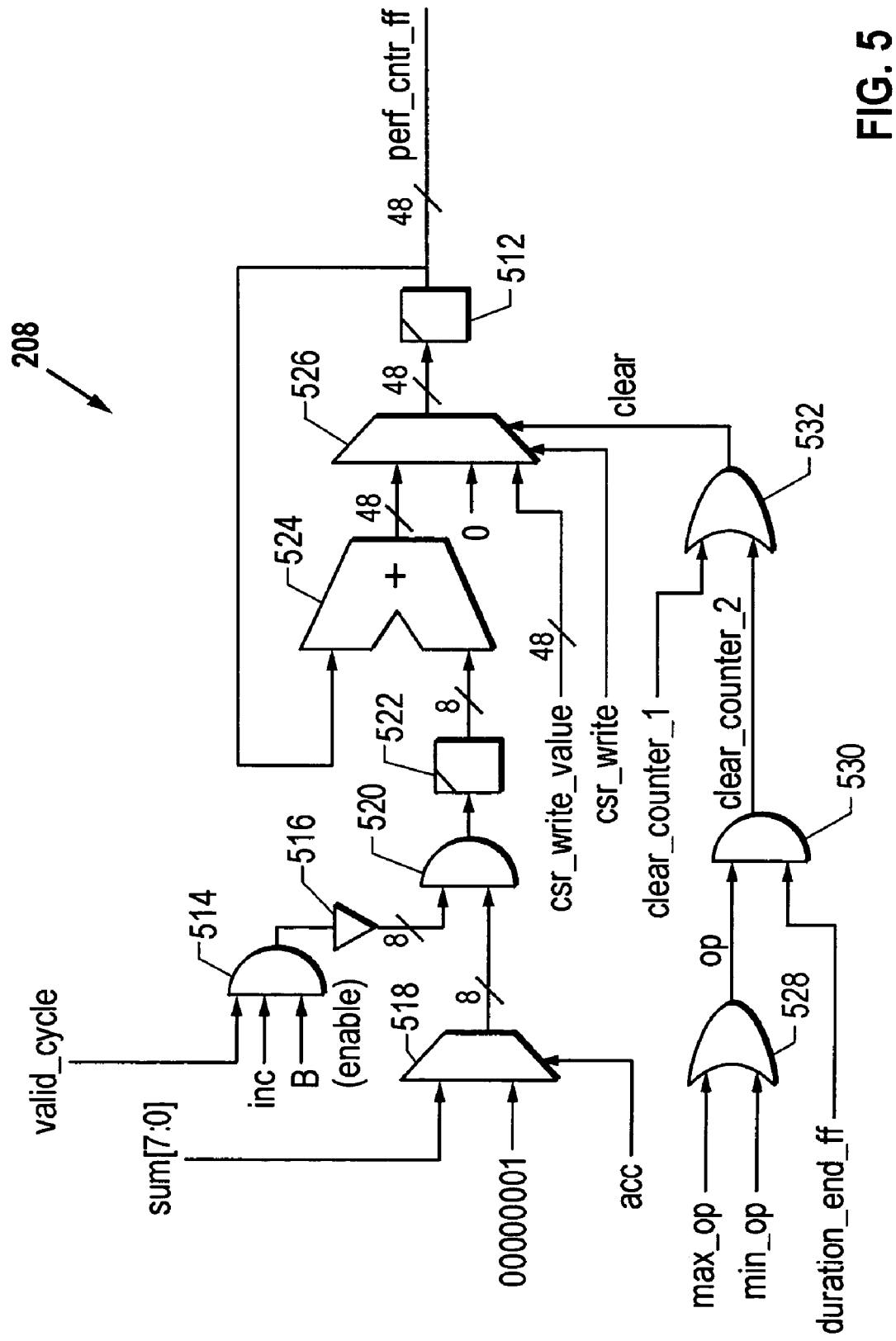
FIG. 5 illustrates a more detailed block diagram of one embodiment of the counter circuit illustrated in FIG. 2.

FIG. 5 illustrates a more detailed block diagram of one embodiment of the counter circuit illustrated in FIG. 2. As discussed, the counter circuit 208 is an X bit counter that can hold, increment by one, add S bits, clear, or load a value into a count value register 512. Other processing may also occur in order to read the value of the register 512. In the embodiment illustrated in FIG. 5, X is equal to 48. Counter circuit 208 is enabled by setting a counter enable signal B, which comprises one input of a three-input AND gate 514. The second input of the AND gate 514 is the valid_cycle signal and the third input of the AND gate 514 is connected to receive the inc signal from the edge detect circuit 210. The valid_cycle signal indicates the validity of the data associated with the inc signal. If the valid_cycle signal is de-asserted, then the counter circuit 208 ignores the data associated with inc signal. On the other hand, if the valid_cycle signal is asserted active high, then the counter circuit 208 effectuates the counter circuit operation generally described in the co-pending Edge Detect Circuit application and MIN/MAX Circuit application cross-referenced hereinabove.

Additionally, in the context of performing computations on data obtained across clock domain interfaces, the operation is set forth as follows. When the counter circuit 208 is enabled, a valid_cycle signal is asserted, and the validated inc signal is activated, a logic one is output from the AND gate 514. In any other case, the output of the AND gate 514 will be a logic zero. The output of the AND gate 514 is replicated by an 8× replicator 516 and the resulting 8-bit signal is bit-wise ANDed with an 8-bit signal output from a MUX circuit 518. The inputs to the MUX circuit 518 are the sum[7:0] signal output from the szero circuit 206 and an 8-bit signal the value of which is [00000001]. The sum[7:0] signal will be output from the MUX circuit 518 when the acc signal is activated; otherwise, the [00000001] signal will be output from the MUX circuit.

An AND circuit, represented by an AND gate 520, bit-wise ANDs the signals output from the replicator 516 and from the MUX circuit 518. The resulting 8-bit signal is input to a register 522. An adder 524 adds the 8-bit signal stored in the register 522 to the 48-bit sum stored in the count value register 512. The new sum output from the adder 524 is input to a MUX circuit 526 that is connected to receive two other inputs: a logic zero and a csr_write_value, respectively. When a csr_write signal is enabled and the MUX circuit 526 is activated, the value of csr_write_value is output from the MUX circuit 526 and written to the count value register 512. In this manner, a value can be selectively loaded into the count value register 512.

Similarly, when a clear signal is asserted, 48 zero bits are output from the MUX circuit 526 to the count value register 312, thereby clearing the register. The generation of the clear signal involves an OR gate 528 having a max_op signal and a min_op signal as inputs that represent the minimum duration mode and maximum duration mode of the min/max circuit 212, respectively. If either operational mode is activated, an op signal is driven to AND gate 530 which also receives the duration_end_ff signal from the min/max circuit 212. If both the op signal and duration_end_ff are asserted active high then a clear_counter_2 signal is driven to an OR gate 532 which also receives a clear_counter_1 signal. Hence, if either the clear_counter_1 signal or the clear_counter_2 signal is asserted active high, then the clear signal is driven to MUX circuit 526 as discussed hereinabove.

If neither the csr_write signal nor the clear signal is asserted and the acc signal is asserted, the output of the adder 524 is written to the count value register 512, thereby effectively adding S bits (i.e., the value of the sum[7:0] signal) to the previous value of the count value register 512. Not enabling the counter circuit 208 results in the count value register 512 being held at its current value. Finally, to increment the value of the count value register 312 by one, the counter circuit 208 must be enabled, the inc signal must be asserted, and the acc signal must not be asserted.

An implementation of the invention described herein thus provides for a general purpose performance counter that may be utilized to validate data collected in a clock domain different from that of the performance counter or to validate data collected from the clock domain of the performance counter. The embodiments shown and described have been characterized as being illustrative only; it should therefore be readily understood that various changes and modifications could be made therein without departing from the scope of the present invention as set forth in the following claims. For example, while the embodiments are described with reference to an ASIC, it will be appreciated that the embodiments may be implemented in other types of ICs, such as custom chipsets, Field Programmable Gate Arrays ("FPGAs"), programmable logic devices ("PLDs"), generic array logic ("GAL") modules, and the like. Furthermore, while the embodiments shown are implemented using CSRs, it will be appreciated that control signals may also be applied in a variety of other manners, including, for example, directly or may be applied via scan registers or Model Specific Registers ("MSRs"). In addition, the various logic modules may be realized in any known or heretofore unknown hardware implementations where certain signal logic levels or their complements are utilized appropriately. Accordingly, all such modifications, extensions, variations, amendments, additions, deletions, combinations, and the like are deemed to be within the ambit of the present invention whose scope is defined solely by the claims set forth hereinbelow.

What is claimed is:

1. A performance monitoring system, comprising:
   a first observability bus operable to collect data from a first system under test in a first clock domain;
   a second observability bus operable to collect data from a second system under test in a second clock domain;
   validation circuitry in communication with said first and second observability buses, said validation circuitry being operable to select between said first and second observability buses and generate a validation signal that is asserted high during a clock cycle in which said selected observabiiity bus contains valid data and asserted low when said selected observability bus contains invalid data; and
   a performance counter operable to perform performance computations in response to receiving said data from said selected observability bus and said validation signal.

2. The system as recited in claim 1, wherein said first observability bus is disposed in said first clock domain having a clock rate of N clock cycles and said performance counter is disposed in said second clock domain having a clock rate of M clock cycles, wherein N equals M.

3. The system as recited in claim 1, wherein said first observability bus is disposed in said first clock domain having a clock rate of N clock cycles and said performance counter is disposed in said second clock domain having a clock rate of M clock cycles, wherein N does not equal M.

4. The system as recited in claim 1, wherein said second observability bus and said performance counter are disposed in said second clock domain.

5. The system as recited in claim 1, wherein said validation circuitry further comprises:
   a synchronizer disposed at an interface of said first clock domain and said second clock domain, said synchronizer in communication with said first observability bus in order to effectuate the transfer of said data across said interface;
   a synchronizer controller for driving a control signal to said synchronizer;
   a multiplexer block operable, responsive to a MUXSEL signal, to select between said first observability bus and said second observability bus; and
   a logic block connected to receive a core mode signal and a transfer control signal for generating said validation signal.

6. The system as recited in claim 5, wherein said multiplexer block is operable to intermix data from said first and second observability buses.

7. The system as recited in claim 1, wherein said performance counter further comprises:
   an AND/OR circuit connected to receive said data from said selected observability bus;
   an edge detect circuit connected to receive from said AND/OR circuit a raw increment signal that, when activated, causes said edge detect circuit to assert an increment signal each time an event initiates an events signal; and
   a counter circuit connected to receive from said edge detect circuit said increment signal that, when activated, causes said counter circuit to increment a current count value,
   wherein said edge detect circuit receives said validation signal in order to ignore invalid cycles within said data from said selected observability bus.

8. The system as recited in claim 1, wherein said performance counter further comprises:
   an AND/OR circuit connected to receive said data from said selected observability bus;
   a min/max circuit connected to receive from said AND/OR circuit a raw increment signal that, when activated, causes said min/max circuit to generate a duration signal indicative of the duration of an event relative to an events signal; and
   a counter circuit connected to receive from said edge detect circuit,
   wherein said mm/max circuit receives said validation signal in order to ignore invalid cycles within said data from said selected observability bus.

9. The system as recited in claim 1, wherein said performance counter further comprises:
   an AND/OR circuit connected to receive said data from said selected observability bus;
   an edge detect circuit connected to receive from said AND/OR circuit a raw increment signal that, when activated, causes said edge detect circuit to assert an increment signal each time an event initiates relative to an events signal; and
   a counter circuit connected to receive from said edge detect circuit said increment signal that, when activated, causes said counter circuit to increment a current count value,
   wherein said counter circuit receives said validation signal in order to ignore invalid cycles within said data from said selected observability bus.

10. The system as recited in claim 1, wherein said validation signal is utilized by said performance counter to discriminate against invalid cycles in said data from said selected observability bus.

11. A multi-domain performance monitoring system, comprising:
    a first observability bus operable to collect data from a first system under test in a first clock domain;
    a second observability bus operable to collect data from a second system under test in a second clock domain;
    means for selecting between said first and second observability buses;
    means, responsive to said selection, for generating a validation signal that is asserted in a clock cycle when said selected observability bus contains valid data and de-asserted when said selected observability bus contains invalid data; and
    means for performing performance computations in response to receiving said data from said selected observability bus and said validation signal.

12. The system as recited in claim 11, wherein said first observability bus is disposed in said first clock domain having a clock rate of N clock cycles and said performance counter is disposed in said second clock domain having a clock rate of M clock cycles, wherein N equals M.

13. The system as recited in claim 11, wherein said first observability bus is disposed in said first clock domain having a clock rate of N clock cycles and said performance counter is disposed in said second clock domain having a clock rate of M clock cycles, wherein N does not equal M.

14. The system as recited in claim 11, wherein said second observability bus and said performance counter are disposed in said second clock domain.

15. The system as recited in claim 11, wherein said validation signal is utilized by said means for performing performance computations to discriminate against invalid cycles in said data from said selected observability bus.

16. The system as recited in claim 11, wherein said means for selecting is operable to intermix data from said first and second observability buses on a data block by data block basis.

* * * * *

UNITED STATES PATENT AND TRADEMARK OFFICE
CERTIFICATE OF CORRECTION

| | |
|---|---|
| PATENT NO. | : 7,624,319 B2 |
| APPLICATION NO. | : 11/022079 |
| DATED | : November 24, 2009 |
| INVENTOR(S) | : Richard W. Adkisson et al. |

It is certified that error appears in the above-identified patent and that said Letters Patent is hereby corrected as shown below:

In column 8, line 61, in Claim 1, delete "observabiiity" and insert -- observability --, therefor.

In column 9, line 57, in Claim 8, delete "mm/max" and insert -- min/max --, therefor.

Signed and Sealed this

Ninth Day of February, 2010

David J. Kappos
*Director of the United States Patent and Trademark Office*